Jan. 11, 1927.  1,613,596
H. E. ALTGELT
PLOW STRUCTURE
Filed May 20, 1922    4 Sheets-Sheet 1
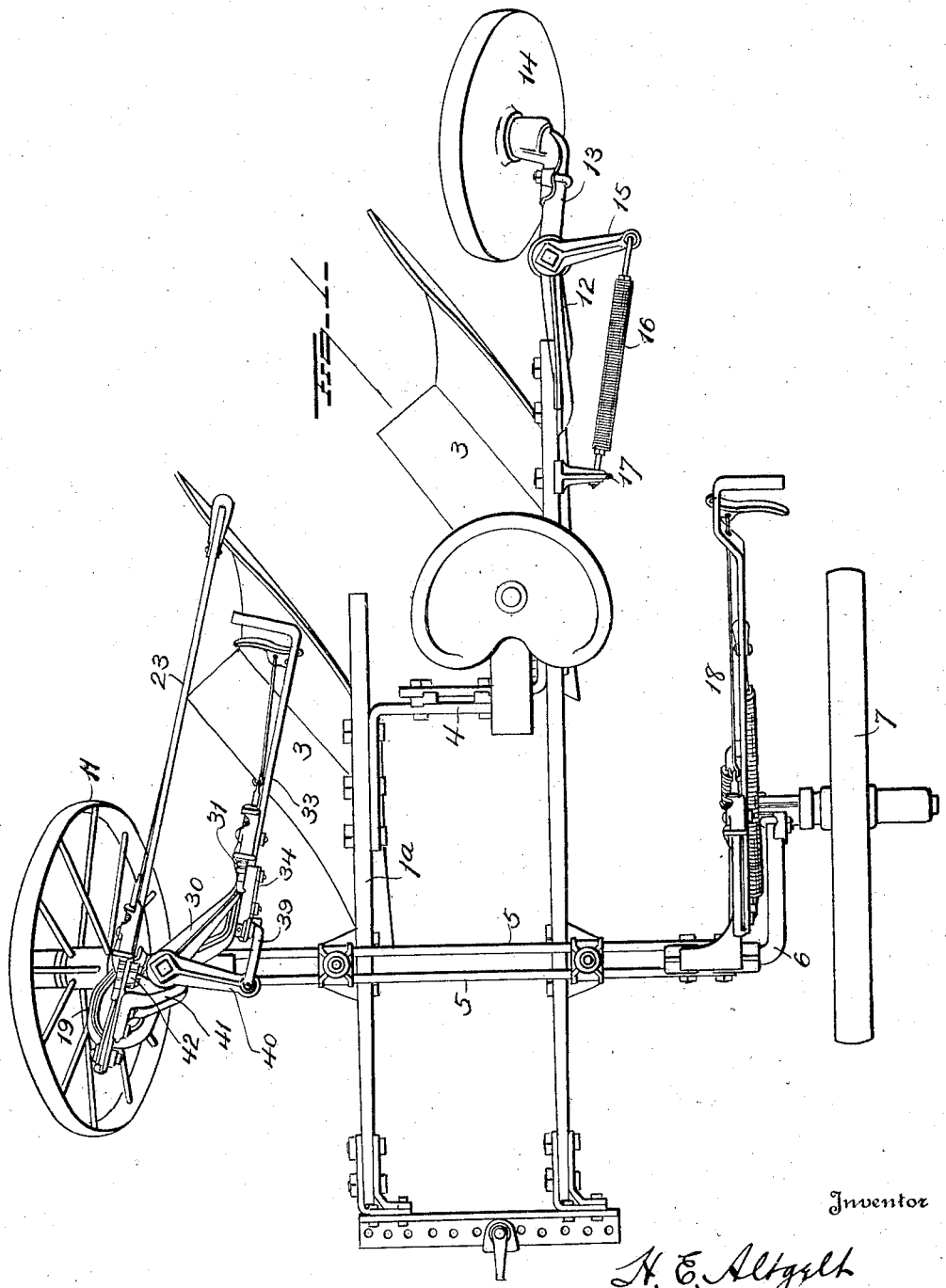

Jan. 11, 1927.  H. E. ALTGELT  1,613,596
PLOW STRUCTURE
Filed May 20, 1922   4 Sheets-Sheet 2
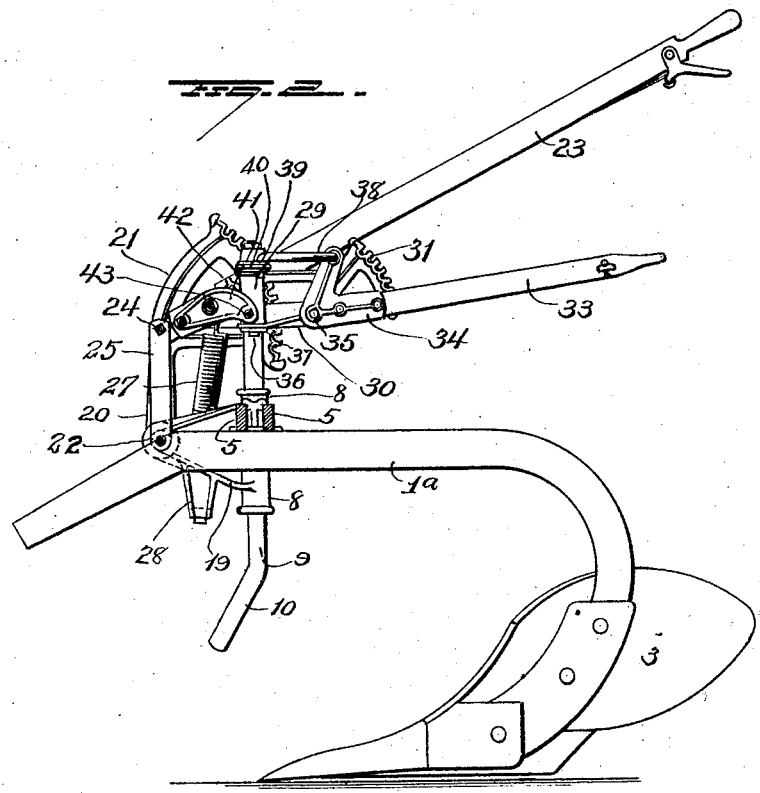
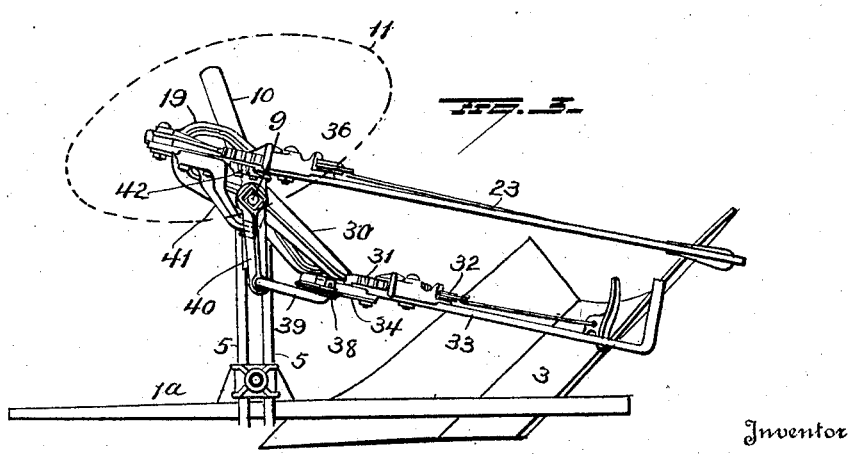
Inventor
H. E. Altgelt
By Seymour & Bright
Attorneys Jan. 11, 1927.  H. E. ALTGELT  1,613,596
PLOW STRUCTURE
Filed May 20, 1922  4 Sheets-Sheet 3
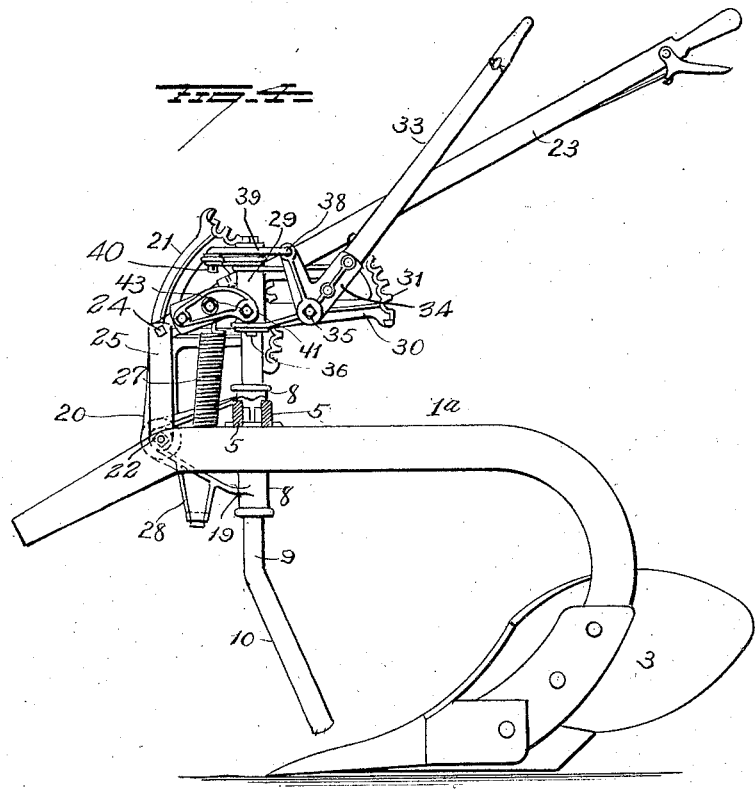
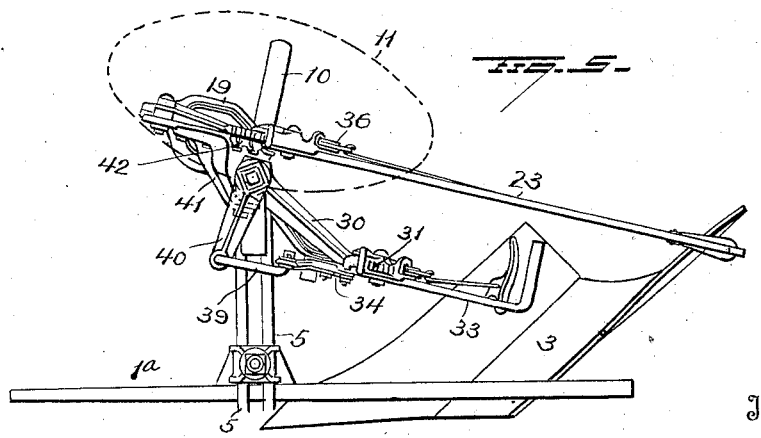
Inventor
H. E. Altgelt
By Seymour & Bright
Attorneys

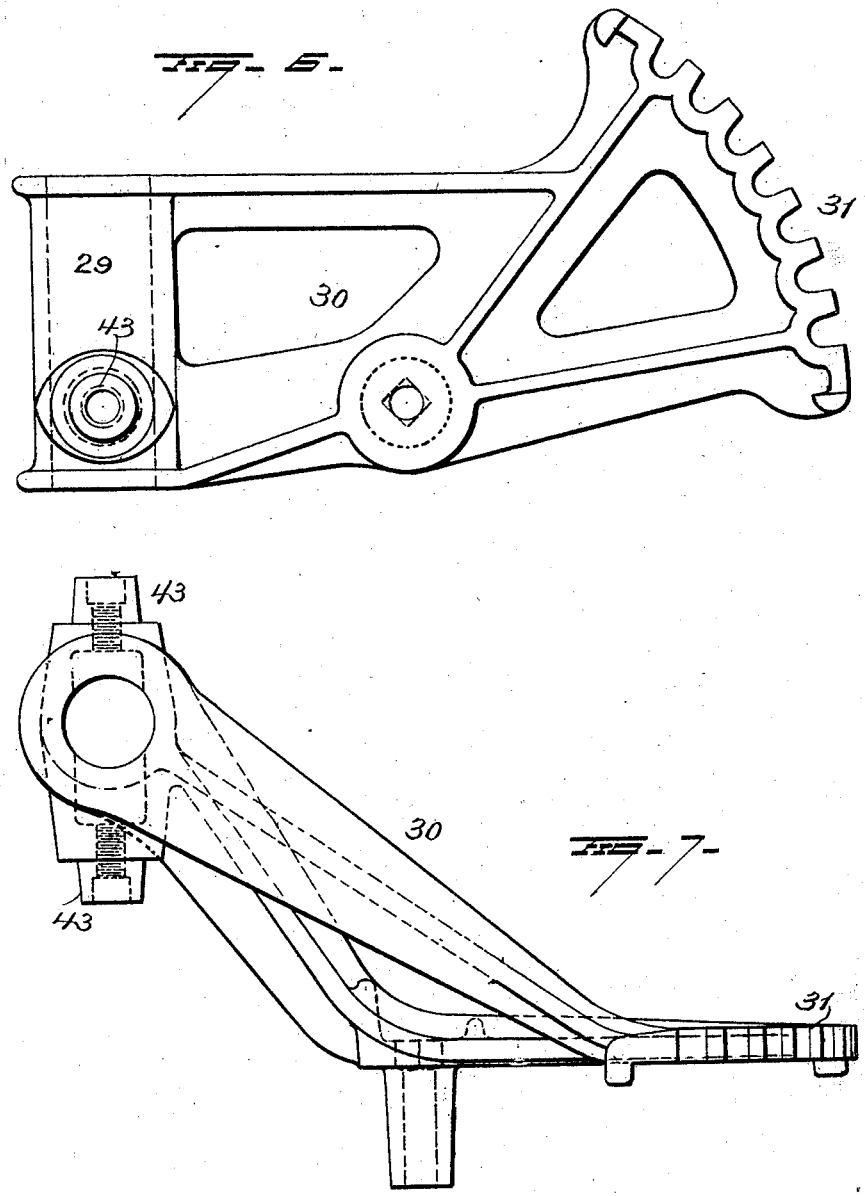

Patented Jan. 11, 1927.

1,613,596

UNITED STATES PATENT OFFICE.

HERMAN E. ALTGELT, OF SOUTH BEND, INDIANA, ASSIGNOR TO OLIVER CHILLED PLOW WORKS, OF SOUTH BEND, INDIANA.

PLOW STRUCTURE.

Application filed May 20, 1922. Serial No. 562,420.

This invention relates to improvements in plow structures and more particularly to mechanism whereby a horse-drawn plow may be guided and one side of the frame raised and lowered for leveling or other purpose,— one object of the invention being to provide simple and efficient means mounted on and associated with a forward furrow wheel axle of the "standard" type, which shall be manually operable by the plowman to so shift the furrow wheel as to keep the plow body to the furrow line when the team deviates in one direction or the other from such line or does not pull in or follow a straight or proper course.

With this and other objects in view, the invention consists in certain novel features of construction and combinations of parts as hereinafter set forth and pointed out in the claims.

In the accompanying drawings; Figure 1 is a plan view of a plow structure embodying my improvements; Figure 2 is a side elevation partly in section of a portion of the plow structure showing the lever mechanism associated with the front furrow wheel axle showing positions of the parts when adjusted to cause the plow to move to the left; Figure 3 is a plan view of the structure shown in Figure 2; Figures 4 and 5 are views similar to Figures 2 and 3, but showing the positions of the parts when adjusted to cause the plow to move to the right, and Figures 6 and 7 are enlarged side and plan views respectively illustrating the segment frame.

In the embodiment of the invention shown in Figure 1 of the drawing, the plow frame comprises parallel plow beams 1, 1ª, connected at their forward ends by a hitch bar 2 and provided at their rear ends with depending portions to which plow bases 3 are suitably secured. The rear portions of the beams 1, 1ª are connected by braces 4, and the plow frame also includes parallel cross bar or beam members 5, 5, clamped to the plow beams. A crank axle member 6 is connected with the cross beam members 5 at one end thereof and the spindle portion of said crank axle is suitably mounted in the hub of a land wheel 7. A vertical sleeve 8 is clamped between the cross beam members 5 near the furrow-side of the plow, for the accommodation of an upright or standard axle 9, the latter having an inclined or cranked lower portion 10 on which a furrow wheel 11 is mounted.

A bracket 12 may be secured to the rear end of the plow beam 1 to provide a pivotal bearing for the axle 13 of a follower wheel 14, and said axle 13 may be provided with an arm 15, to which one end of a spring 16 may be attached,—the other end of said spring being connected with an arm 17 projecting laterally from the plow beam.

Lever mechanism indicated at 18 may be provided so as to be cooperable with the crank axle member 6 and the plow frame for adjusting the latter vertically, but as the particular construction and arrangement of these devices form no part of my present invention, they need not be specifically described herein.

The bearing sleeve 8 through which the furrow wheel axle 9 passes, is provided with a forwardly projecting arm 19 with which a depending arm 20 of a toothed segment frame 21 has hinged connection, as indicated at 22. A hand lever 23 is pivotally connected at 24 with the segment frame 21 approximately at the upper end of the arm 20 and a steel bar or link 25 extending between the pivot bearings 22 and 24 serves to keep the slack out of these bearings and as a support for the segment frame 21.

The hand lever 23 is provided with a manually operable detent 26 to cooperate with the toothed portion of the segment frame, and a spring 27 may be connected at its upper end with said hand lever and at its lower end with a projection 28 depending from the arm 19.

A barrel or sleeve 29 which may be formed as an integral part of a toothed segment frame 30, is mounted on the upper portion of the upright furrow wheel axle 9. The segment frame 30 projects rearwardly from the axle 9 and its toothed rear portion 31 is adapted to be engaged by a detent 32 carried by a hand lever 33, the portion 34 of which is pivotally connected at 35 with the segment frame 30. The segment frame 30 is prevented from downward movement on the axle 9 by means of a pin 36 passing transversely through the axle under the barrel or sleeve 29, and a washer 37 may be interposed between the latter and said pin. The portion 34 of the hand lever is made approximately L-shaped, having an upwardly projecting arm 38, and the latter is connected by a link 39 with an arm 40 secured to the furrow wheel axle 9. The axle 9 is free to be turned in the sleeve 29 of the segment frame 30, by operation of the lever 33, and the latter is held against turning by two arms 41 and 42 which are securely bolted to the hand lever 23 and together, form a yoke or fork having pivotal connection, at 43—43, (Figs. 6 and 7) at diametrically opposite sides of the barrel or sleeve 29 of the segment frame 30.

From the construction and arrangement of parts hereinbefore described, it will be seen that means for guiding the travel of the plow by shifting the front furrow wheel and locking the furrow wheel axle in adjusted position, are mounted upon and carried by the furrow wheel axle and that means are also provided whereby the plow frame may be adjusted vertically on the furrow wheel axle without interference with operation of the guiding means.

As the hand lever 23 is connected with the plow frame through the medium of the segment frame arm 20, the arm 19 and bearing sleeve 8, and as said lever is connected with the upper portion of the furrow wheel axle 9, through the medium of the arms 41 and 42 and the barrel or sleeve 29 of the segment frame 30, downward and rearward movement of said hand lever 23 will cause downward pressure on said axle and upward movement of the plow frame to effect vertical adjustment of the latter.

When the hand lever 33 is moved upwardly or downwardly, motion will be transmitted, through the link 39 and arm 40 to the axle 9 to partly rotate the latter in one direction or the other and the cranked portion 10 of said axle to be shifted backwardly or forwardly and change the angle to the furrow wheel to the line of draft of the plow. It is apparent that when the lever 33 is moved downwardly to the extent permitted by the teeth 31 of the segment frame 30, the parts will assume the positions shown in Figures 2 and 3 and in thus moving said lever 33, the axle will be so turned as to cause its cranked portion to move forwardly to the position shown in Figure 2 and the furrow wheel 11 to assume the angle indicated by dotted lines in Figure 3, thereby causing a tendency of the plow structure to move to the left. When the hand lever 33 is raised to the position indicated in Figure 4, the axle 9 will be turned in a direction to cause the cranked portion 10 thereof to move rearwardly and the furrow wheel 11 will assume the dotted line position shown in Figure 5 and tendency of the plow structure will be to move to the right. Thus by manipulating the lever 33, the plow structure may be kept properly to the furrow when the team deviates from a straight or correct course or does not pull straight.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In a plow structure, the combination with a frame, a forward upright furrow wheel axle, and a furrow wheel, of a segment frame having a sleeve portion mounted on said axle, means for preventing said segment frame from turning on the axle, a hand lever pivoted to said segment frame and cooperable therewith to hold said lever in adjusted position, an arm on said lever, an arm on the axle and a link connecting said arms, whereby operation of said lever will turn said axle.

2. In a plow structure, the combination with a frame, a forward upright furrow wheel axle having a lower cranked portion, and a furrow wheel on said cranked portion of the axle, of a segment frame having a sleeve portion mounted on said axle, a hand lever, means effecting pivotal connection of said hand lever with the plow frame, arms secured to said hand lever and pivotally connected with the sleeve portion of said segment frame, a hand lever pivotally connected with said segment frame and cooperable therewith to hold said last-mentioned hand lever in adjusted position, and connections between said last mentioned hand lever and said furrow wheel axle for turning the same.

3. In a plow structure, the combination with a main frame, a forward upright furrow wheel axle having a cranked lower portion, and a furrow wheel on said cranked portion of the axle, of a segment frame mounted on said axle, means for holding the segment frame from turning relative to the frame, means for adjusting said frame vertically relative to the segment frame, a hand lever having pivotal connection with said segment frame and cooperable therewith to hold said hand lever in adjusted position, and connections between said hand lever and said axle for turning the latter.

4. In a plow structure, the combination with a main frame, of a vertical bearing sleeve secured thereto, said sleeve having a forwardly projecting arm, an upright forward furrow wheel axle mounted in said sleeve and having a cranked lower portion, a furrow wheel on said cranked portion of the axle, a segment frame having pivotal connection with the arm on said bearing sleeve, a hand lever pivoted to said segment frame and cooperable therewith, a segment frame having a sleeve portion mounted on the upright axle, arms secured to said hand lever and having pivotal connection with the sleeve portion of said last-mentioned segment frame, a hand lever having pivotal connection with said last-mentioned segment frame, and connections between said last mentioned hand lever and said axle for turning the latter.

5. In a plow structure, the combination with a main frame, of a vertical bearing sleeve secured thereto, said sleeve having a forwardly projecting arm, an upright forward furrow wheel axle mounted in said sleeve and having a cranked lower portion, a furrow wheel on said cranked portion of the axle, a segment frame having pivotal connection with the arm on said bearing sleeve, a hand lever pivoted to said segment frame and cooperable therewith, a link between the pivotal connection of said segment frame with said arm and the pivotal connection of said hand lever with said segment frame, a segment frame having a sleeve portion mounted on the upright axle, arms secured to said hand lever and having pivotal connection with the sleeve portion of said last-mentioned segment frame, a hand lever having pivotal connection with said last-mentioned segment frame, and connection between said last mentioned hand lever and said axle for turning the latter.

6. In a plow structure, the combination with a main frame, of a vertical bearing sleeve secured thereto, said sleeve having a forwardly projecting arm, an upright forward furrow wheel axle mounted in said sleeve and having a cranked lower portion, a furrow wheel on said cranked portion of the axle, a segment frame having pivotal connection with the arm on said bearing sleeve, a hand lever pivoted to said segment frame and cooperable therewith, a segment frame having a sleeve portion mounted on the upright axle, arms secured to said hand lever and having pivotal connection with the sleeve portion of said last-mentioned segment frame, a hand lever having pivotal connection with said last-mentioned segment frame, connections between said last mentioned hand lever and said axle for turning the latter, and a spring between the arm on the bearing sleeve and said first-mentioned hand lever.

In testimony whereof, I have signed this specification.

HERMAN E. ALTGELT.